United States Patent [19]

Neumann

[11] 4,334,900
[45] Jun. 15, 1982

[54] FILTER ELEMENTS ARRANGED IN WASTE TANKS FOR SEPARATING SUBSTANCES WHICH ARE HARMFUL TO THE HEALTH FROM FLOWING AIR IN CONNECTION WITH NUCLEAR INSTALLATIONS

[75] Inventor: Gerhard-Max Neumann, Berlin, Fed. Rep. of Germany

[73] Assignee: Delbag-Luftfilter GmbH, Fed. Rep. of Germany

[21] Appl. No.: 224,636

[22] Filed: Jan. 12, 1981

[30] Foreign Application Priority Data

Jan. 18, 1980 [DE] Fed. Rep. of Germany ....... 3001289

[51] Int. Cl.³ ............................................. B01D 46/14
[52] U.S. Cl. ..................................... 55/350; 55/417; 55/420; 55/467; 55/482; 55/487; 55/498; 55/521; 55/DIG. 9; 55/512; 55/484
[58] Field of Search .................... 55/DIG. 9, 350, 316, 55/484, 521, 487, 498, 512, 420, 417, 482, 467

[56] References Cited

U.S. PATENT DOCUMENTS 1,890,283 12/1932 Ericksson-Jons ..................... 55/509
3,690,045 9/1972 Neumann ............................. 55/350
4,247,315 1/1981 Neumann ............................. 55/350

FOREIGN PATENT DOCUMENTS 268317 11/1963 Australia ........................ 55/DIG. 9
2549552 5/1977 Fed. Rep. of Germany ........ 55/316
872584 6/1942 France .................................. 55/316
21294 7/1910 Norway ............................... 55/350
1561978 3/1980 United Kingdom ................. 55/482

Primary Examiner—Bernard Nozick
Attorney, Agent, or Firm—Basile, Weintraub & Hanlon

[57] ABSTRACT

Filter elements with changing devices and contamination protection are disclosed. The filter elements are installed in waste tanks and serve to separate substances which are prejudicial to the health when breathed and are used to process air of ventilation systems used in nuclear installations. Two series-arranged standard waste tanks having a coarse material filter layer in one tank and a suspended material filter in another tank are interconnected by a detachable cover constructed for air guidance purposes by means of a lockable, air carrying pipe closable by means of flaps for carrying the supply and spent air which are fixed in a stationary manner to inclined juxtaposed dust laden and clean air ducts with lateral connections. The waste tanks with the incorporated filters can be centrally remotely controlled from one side by lever-transmitted resilient locking systems and can be manually fitted and detached as well.

12 Claims, 14 Drawing Figures

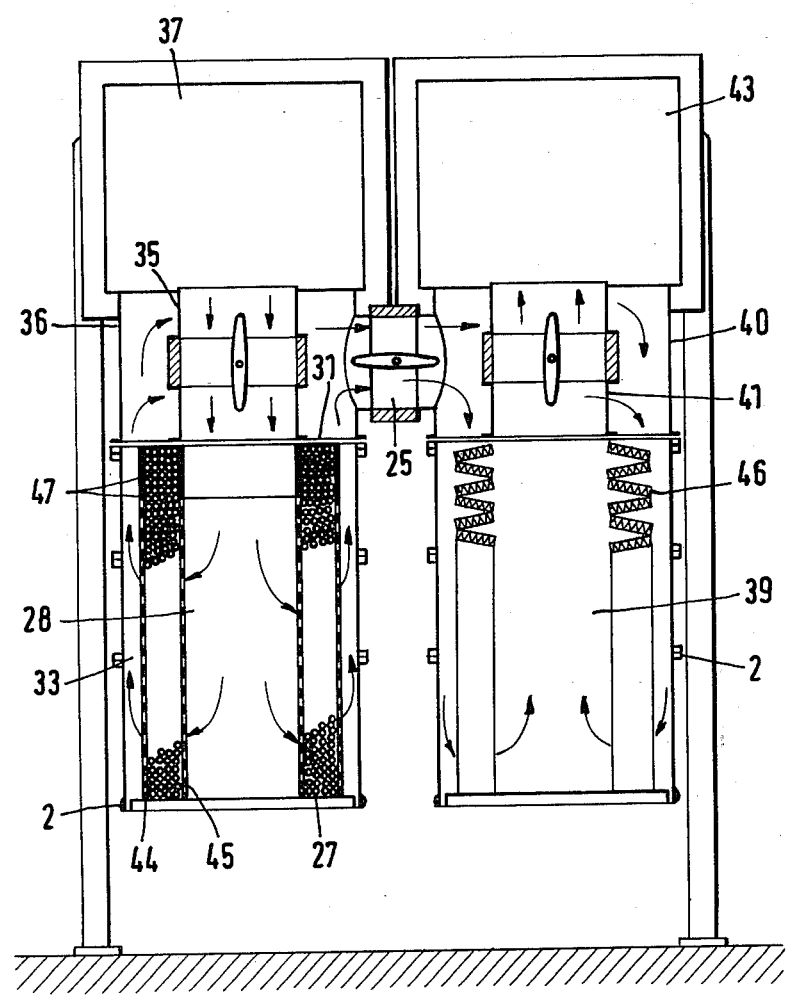

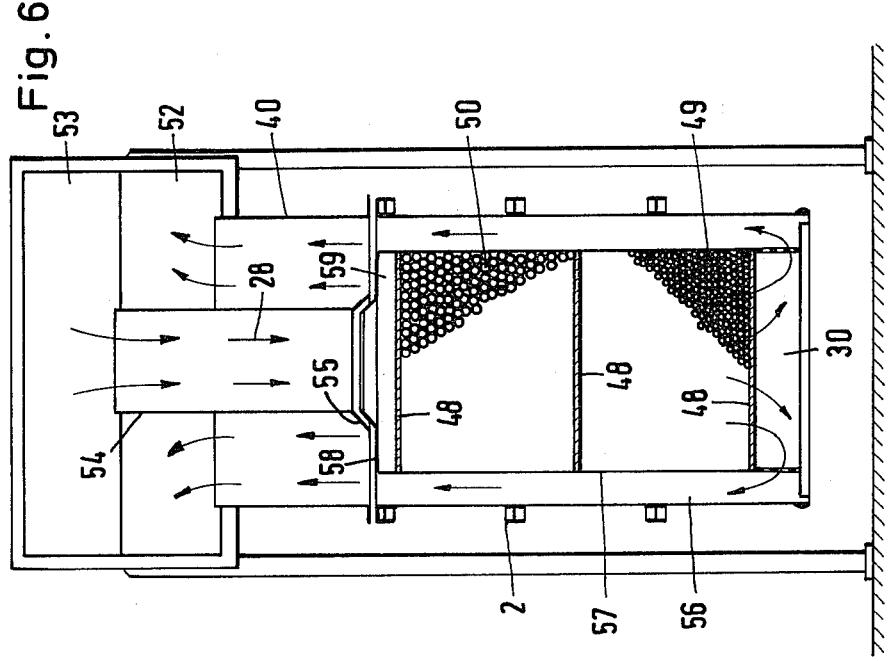
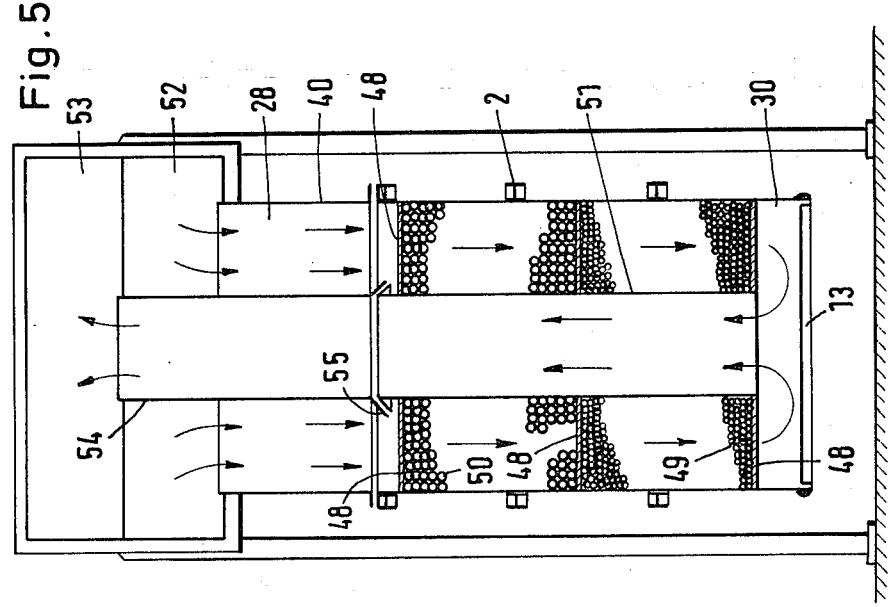

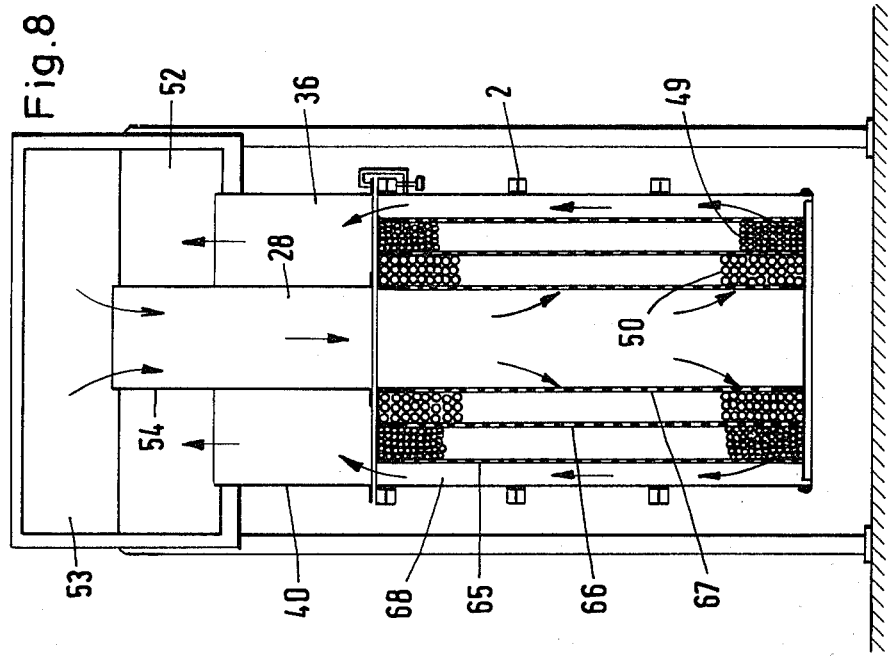
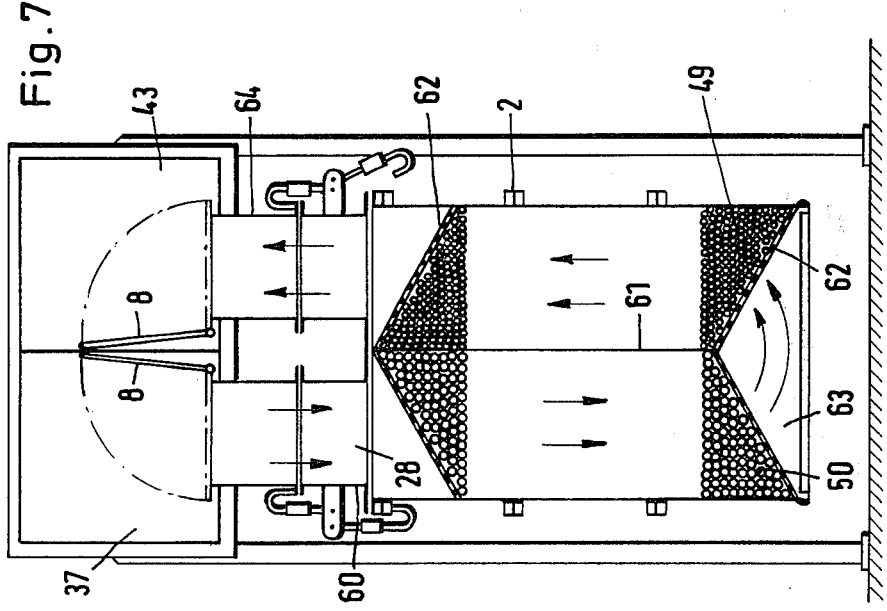

Fig. 13
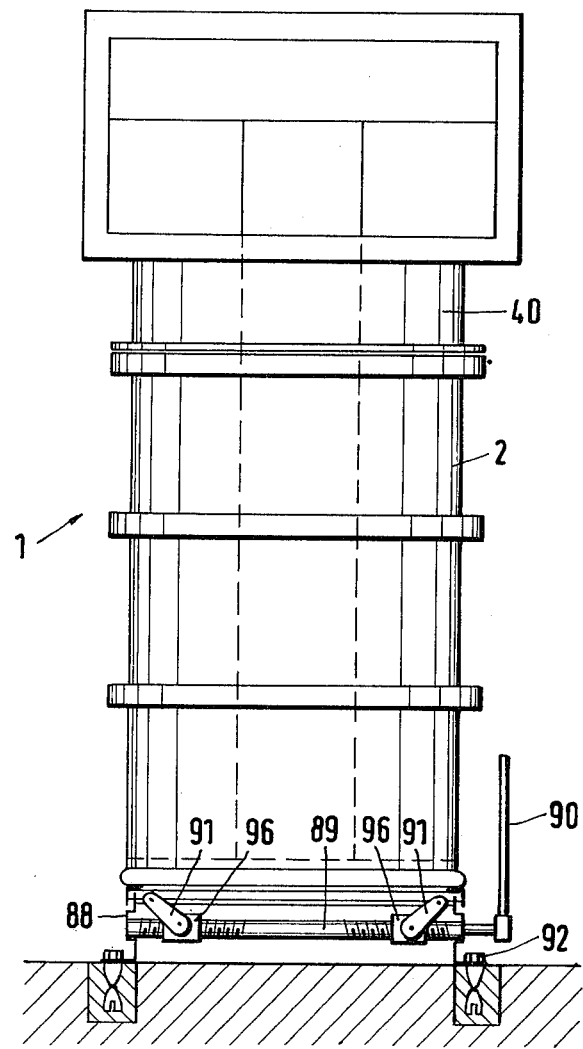
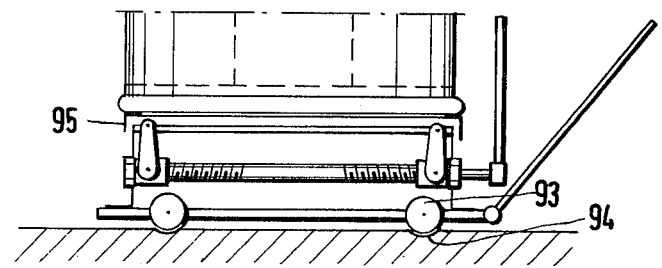

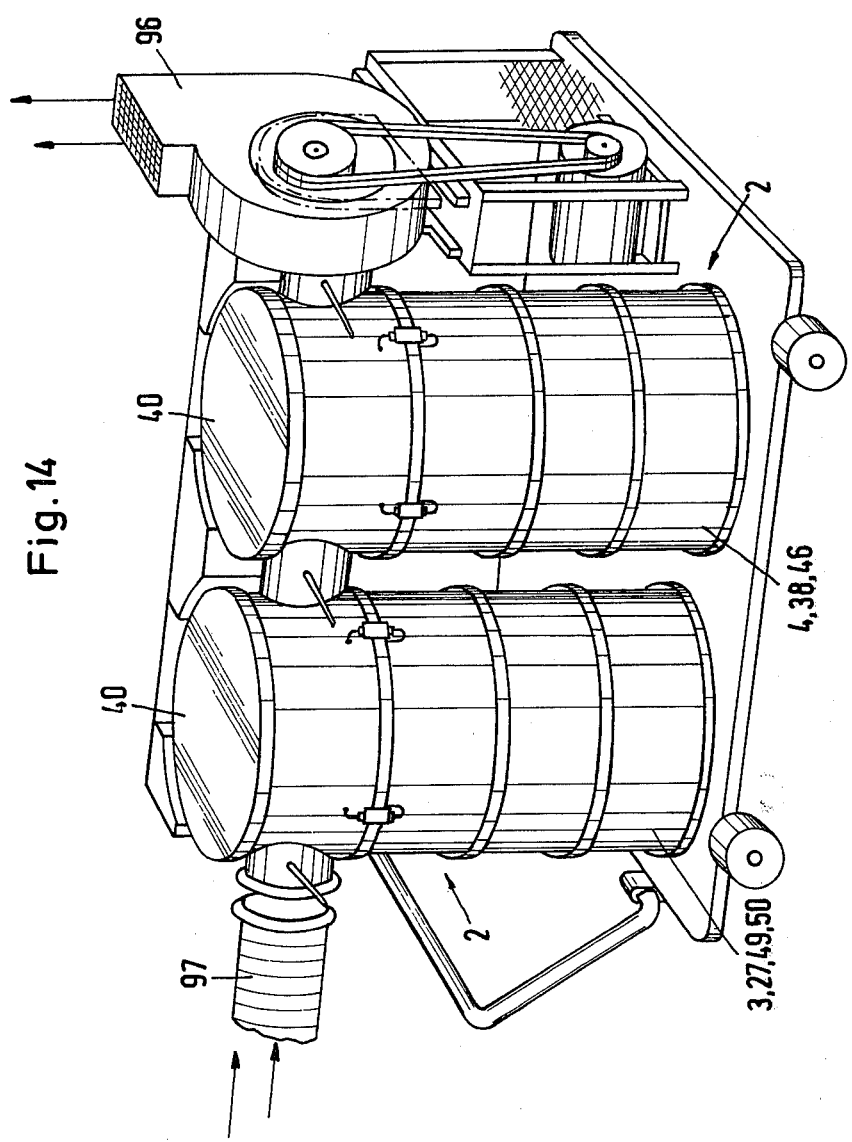

FILTER ELEMENTS ARRANGED IN WASTE TANKS FOR SEPARATING SUBSTANCES WHICH ARE HARMFUL TO THE HEALTH FROM FLOWING AIR IN CONNECTION WITH NUCLEAR INSTALLATIONS

BACKGROUND OF THE INVENTION

The present invention relates to filter elements with changing devices and contamination protection located in the waste tanks, for separating substances which are harmful to the health from the breathing or process air of ventilation systems used in the nuclear field.

According to the present invention, as required, filter layers made from filter paper or granular loose material in the form of sheets, blocks, parallelipipeds, disks, rings, star-shaped member or zig-zag-shaped members are placed in standard 200 or 400 liter waste tanks without any external modifications.

Furthermore, each of the waste tanks is provided with a detachable cover, as well as with a supply air and spent air pipe for the direct connection to superimposed dust laden and clean air ducts.

Transparent protective hoses can be fixed to multiple edge rings arranged on the cover and waste tanks for contamination-free operation and for replacing the used tank filters.

According to the present invention, the covers of the waste tank filters or drum filters are provided with remote control components which serve, after closing the flaps, to either detach the waste tank with the fitted filter from the seals or to fix a new filter tank to the air carrying ducts.

Other filtering problems may occur which may require putting out of commission and the dismantling of no longer usable nuclear piles. An easy and safe procedure for changing filters containing nuclear waste is needed.

Uneconomical operation, expired service life or the no longer correctable consequences of a fault are among the reasons for demolition, which lead to such unusual decisions.

It is only in recent times that acceptance requirements have been placed on nuclear power stations in connection with the design of such stations which are easy to maintain, repair and shut down.

Serious environmental protection problems can occur when dismantling and demolishing radioactive ruins and restoring the area to its original state. The shutting down of a reactor does not imply the end of radioactivity and in fact for many years the radio activity is stored deep in the materials of the hot nuclear area. To give but a few examples, these include the core casing of the containment vessel, as well as the various fittings, pipes, pumps and steam generators on which radioactive deposits have collected. Even the concrete envelope of the biological shield area is partly affected by radioactive deposits.

The complete demolition of a nuclear reactor firstly implies that all contaminated parts made from metal or concrete must be crushed under contamination-proof conditions before being transporting away to the final storage point. However, no difficulties are involved in the dismantling of so-called cold power station remains. Demolition methods, used on a trial basis in the U.S., have only in part provided solutions in connection with how such a large scale demolition project can be carried out.

Demolition methods using plasma torch cutting machines in cabins with a high number of air changes or with portable free-burning stations offer better chances for dry demolition than for wet demolition. The problem of disposing of the contaminated liquid would only make the latter process more difficult.

Finely dispersed melting smoke of high density and concentration is produced when cutting up reactor parts, particularly when such parts are made from high-grade steel. This also applies during the flame cutting of reinforced concrete or steel parts. Large amounts of dust from burnt concrete mix with the melting smoke due to oxidation of the metals, so that the dust concentrations in the air can be up to 1 to 2 $g/m^3$ with particle sizes of 0.03 to 30 micrometers. During burning further difficulties occur due to flying sparks or smouldering residues, linked with increased air temperatures, which are more particularly a problem when aluminium oxide particles are contained in the smoke. Furthermore, e.g. a central accumulation of more than 400 g of dust from the highly active area is not possible, because the radiation dose of more than 10 mrem at a distance of 1 meter must not be exceeded for safety reasons.

From the filtering standpoint the problem is to remove harmful emission substances from the waste air in order to reduce the environmental hazards to a minimum. The degree of environmental pollution necessarily drops with the reduction in the dust elimination paths from the separation or cutting station to the waste tanks and from there to the long-term final storage location.

The hitherto proposed filter constructions for the indicated case are too costly from the apparatus standpoint and are therefore very cost-intensive. The numerous intermediate stations from the dust formation point to the dust collection containers with the long distances up to the point of filling into the standard waste tanks are subject to a high risk due to the spreading hazards and are only suitable if account can be taken of the aforementioned difficulties, such as e.g. occur when using electrostatic precipitators, tube filters or top-quality cyclone combinations with series-connected fine filters.

CROSS REFERENCE TO RELATED APPLICATIONS

This application is related to the Applicant's co-pending U.S. patent application Ser. No. 966,006 filed Dec. 4, 1978, now U.S. Pat. No. 4,247,315 and entitled "Filter Element".

DESCRIPTION OF THE PRIOR ART

The Applicant's co-pending application, now U.S. Pat. No. 4,247,315 discloses filter elements in housings which are equipped with exchange devices and contamination protection for the precipitation of materials which are injurious to the health of people breathing unfiltered air. Heat sealable plastic sleeves are provided to extend from the waste container to the domed lid to which it is attached in normal operation. A safe exchange of the waste container is accomplished by lowering the waste container from the domed lid, heat sealing the sleeve transversely between the domed lid and the waste container, and severing the sleeve along the heat sealed portion.

BRIEF SUMMARY OF THE INVENTION

In principle the present invention is based on the problem to provide waste tanks with filter elements arranged therein for separating substances which are harmful to the health from the air in which the filters are fixed to pipes or ducts by pressure mechanisms. Following saturation of the filter elements, and without additional expenditure, particularly in the case of high dust contamination, it must be possible to directly transport them to a final storage location.

The present invention relates to a filtration plant which comprises two series arranged standard 200 or 400 liter waste tanks with, in each case, a fitted single or two-stage loose material or sand bed filter and a suspended material filter interconnected by a detachable cover constructed for air guidance purposes by means of a lockable, air-carrying pipe connecting piece. Projecting central pipes closable by means of flaps for carrying the supply and spent air are in each case fixed in a stationary manner to a superimposed, inclined, juxtaposed dust laden and clean air duct with lateral connections, while the waste tanks with the incorporated filters on the covers can be centrally remotely controlled from one side at four points by lever-transmitted, resilient locking systems or can be manually fitted or detached.

According to another embodiment of the invention the coarse filter layer placed in the waste tank comprises an air-permeated porous loose material layer, e.g. of homogeneously fractionated crushed sand, which can be charged with harmful substances from bottom to top and is fitted between an upper, perforated plate covering and inserted horizontally over the entire tank cross-section and a lower, perforated plate which is spaced from the tank bottom and between in each case one central pipe or air supply pipe sealable by means of pivotable flaps and located in the tank center. If necessary, the lower cavity between the perforated plate and the tank bottom can be filled with a granular coarse loose material through which the dust laden air must pass before it comes into contact with the coarse filter layer and subsequently flows via the cover and the pipe connecting pieces lockable by the pivoted flaps into the waste tank with the fitted suspended material filter, against which air flows from the outside to the inside and is removed again at the top through the cover central pipe via the spent air duct.

In this way large particles of dust are first filtered out of the air before the air passes to the suspended material filter to extend the operating time of the filters before saturation. According to another advantageous embodiment of the invention, the covered coarse filter waste tank sealable by a pivoted flap in the central pipe, is provided with a cover and a sealable pipe connecting piece which has an intermediate container filled e.g. with granular loose material. The intermediate container is centrally arranged and is traversed from top to bottom by air laden with harmful substances, and towards the inner wall of the waste tank said intermediate container forms an annular cavity for the outflow of the clean air and having at the top and bottom over the entire intermediate container cross-section in each case one horizontally inserted diskshaped perforated plate covering leaving open air carrying cavities both at the top towards the centrally perforated intermediate container cover and at the bottom towards the waste tank bottom. The cavities serve inter alia, like the cavities of the series-connected, starshaped fine filter insert in the adjacent container to enable in the case of considerable contamination of the stored dust the free spaced together with the outer annular cavity between the waste tank and intermediate container wall to be filled from the top with a liquid, self-hardening, radiation protective medium, such as concrete.

According to another embodiment of the invention the coarse filter waste tank is provided with two concentrically telescoped, on edge, top-covered perforated plate jacket rings, sealed by a cover and whose space is filled with loose material, said rings forming internally a porous central pipe and externally an annular cavity towards the inner wall of the waste tank, so that the pre-cleaned air which has peviously traversed the loose material layer in both the thickness direction and the length direction from the supply air duct from top to bottom through the porous central pipe can flow upwards again to the cover and from there via the sealable pipe connecting pieces and the cover to the seriesconnected waste tank with the incorporated suspended material filter for final cleaning purposes and then passed from the outside to the inside via a sealable central pipe to the spent air duct for air carrying purposes.

According to a further embodiment of the invention, the coarse filter waste tank filled with granular loose material has in the inner area a central pipe and three circular perforated plate coverings filling the entire tank cross-section which subdivide the tank space into two cylindrical halves, whose inner areas are e.g. filled with classified sand of different particle sizes and which are successively traversed from top to bottom by the air laden with harmful substances from the crude air duct via the cover until after passing through the cavity between the lowest perforated sheet covering and the tank bottom, the pre-cleaned air leaves the waste tank again via the central pipe and the pure air duct positioned above the supply air duct.

According to another embodiment of the invention the coarse filter waste tank is provided with an intermediate container through which the air laden with harmful substances flows from top to bottom and towards the inner wall of the waste tank leaving open an annular cavity whose inner space is covered by three disk-shaped perforated plates such that two hollow cylinder havles are formed, filled in the air flow direction e.g. with sand particle fractions which become increasingly fine and in which the lowermost perforated plate covering towards the tank bottom and the uppermost perforated plate covering towards the perforated intermediate container cover form cavities. The supply air flows in from an upper supply air duct via a central pipe with a sloping gasket until, after vertically passing through the graded or stepped filter layers, the pre-cleaned air can flow out via the outer cavity between the waste tank and intermediate container and via the cover inner space to the clean air duct.

According to yet another embodiment of the invention the waste tank filled with loose material, e.g. porous crushed sand or an activated contact agent has a precisely centrally located, vertically installed partition which divides off a coarse layer from a finer granular layer. Through the inclined, roof-shaped upper and lower perforated plate coverings forming the cavity the air laden with harmful substances firstly traverses the coarse granular layer from top to bottom and then the fine granular layer from bottom to top and for which purpose are provided in the detachable cover fixed to the waste tank separate and sealable supply and spent air connections, which in turn issue in each case into a juxtaposed supply air and spent air duct.

In order to bring about a complete solution of the problem of the invention, the coarse filter waste tank is subdivided by at least three concentrically telescoped perforated cylinders, which are sealed somewhat at the top, so that two annular cavities successively arranged in the air flow direction are formed, filled with loose material having different particle sizes and whereby the air laden with harmful substances flows via a central pipe from the upper supply air duct through the cover into the waste tank until, after horizontal contact with the step filter layers, the air leaves the waste tank again via the outer cavity between the perforated cover and the inner wall of the tank and through the cover to the superimposed clean air duct.

According to another embodiment of the invention, to bring about the necessary sealing between the cover flange and the coarse filter waste tank flange, a lever-transmitted clamping device engages by means of tensioning or pressing hooks resiliently supported by cup spring plates, said hooks being individually formed by two fixed shafts located in two transverse members on the cover and about whose fulcrums on the shafts are arranged in each case one knee-like articulated lever carrying the rotatable resilient pressure hooks, said levers being connected on the operating side with on each side a left-hand and right-hand power transmission rod held in the centre of an unequal-sided shears with four lever members on which acts e.g. a pneumatic or oil-hydraulic power cylinder producing a self-locking over center or dead-centre position of the levers in order to bring about a permanent cylinder pressure release during filter operation.

According to another embodiment of the invention a lever-transmitted, resilient clamping device acts between the cover and the waste tank filter by means of a linkage operated by a threaded spindle arranged vertically and rotatably between two bearings by means of a ratchet member or, if desired, an eccentric disk with a motor gear in order to move a threaded bushing upwards or downwards, whereby the tie rods articulated in rotary manner thereto can be carried along and are in turn coupled to the four toggle levers and the four resilient pressure or tensioning hooks and the two power transmission shafts brought into a self-locking dead-centre position by the horizontal tension position of the tie rods in order to permanently relieve the drive.

According to another embodiment of the invention the clamping device for the waste tank for attaching to the cover is also provided by means of a lifting or tensioning jack with a right or left-hand thread and a centrally positioned ratchet by means of a lever or by means of a pulsed power cylinder a right and left-hand threaded shaft with end shackles is moved in the direction of the rotary, knee-like lever linkage, so that the self-locking, resilient pressure or tensioning hooks are either fixed to the waste tank flange or, if necessary, can be detached therefrom.

According to another embodiment of the invention the complete waste tank is raised and pressed by a work-table moved in shear-like manner which is fixed to the bottom or is movable on rollers, said worktable being operated by a known, centrally arranged threaded spindle and by nuts located thereon with articulated levers either by means of a ratchet member or by means of automatically operable power transmission elements, the movable worktable version being adjusted by fixed bottom depressions via the rollers.

Finally according to another embodiment of the invention a transportable filtration plant with two waste tanks, a fan and a suction nozzle installed thereon is equipped with a suction cover, whereby in a single or two-stage construction the coarse filter in the first waste tank contains coarse crushed sand or fine basalt or lava sand and the second filter in the second waste tank contains some other contact or separating agent for the subsequent separation and/or the second waste tank is equipped with a large-volume suspended substance filter with fold-out filter paper in disk, cartridge, star or pack form.

BRIEF DESCRIPTION OF THE DRAWINGS

The invention is described in greater detail hereinafter relative to non-limitative embodiments and the attached drawings.

FIG. 4 shows another two-stage filtration plant in which the drum filter in the tank is filled with a coarse filter layer of granular material. The intermediate container is internally and externally porous, so that the air passes approximately horizontally through the filter layer, flowing in from the centre and flowing out again from the cavity between the inner and outer containers. The following drum filter is, for example, a star-shaped or disk-shaped suspended material filter from zig-zag-folded filter paper.

FIG. 5 illustrates a two-stage loose material filter with a superimposed supply and spent air duct. Air flows through the crushed sand initially take place through a coarse granular layer covered with a perforated plate and by means of another perforated plate which separates the following fine grained material through which flow is to take place, to the cavity open at the bottom. After leaving the filter layers, the cleaned air from a central pipe is removed from the tank again and passed into a spent air duct.

FIG. 6 shows a two-stage loose material filter with a divided sand bed in a filter drum installed in the centre of a waste tank. Three perforated plates subdivide two cylindrical filter chambers filled with different particle fractions. The supply air comes from above and initially passes through the coarse and then the fine filter layer. It then flows in the cleaned space from the cavity between the inner and outer containers upwards into the spent air duct.

FIG. 7 is another variant of a two-stage drum filter centrally separated by a partition. Firstly the supply air arriving from the top flows through the left-hand loose material chamber with the coarse material and then the right-hand chamber with the finer material. The waste tank with the filter has a supply and spent air connection with separate connecting channels.

FIG. 8 shows a two-stage filter with wire strainers forming two filter chambers filled with sand or some other contact agent. By means of different separating media two stages can act successively, the air laden with the harmful substances taking a horizontal path from the inside to the outside in the tank, after which it flows out of the cavity again between the wire strainer, inner container and outer container.

FIG. 13 shows a clamping device for drum filters comprising a lifting table anchored to the bottom or a movable lifting carriage fixed in bottom depressions and raised by spindle rotations which can be lowered as required.

DESCRIPTION OF THE PREFERRED EMBODIMENTS

Figure 1:
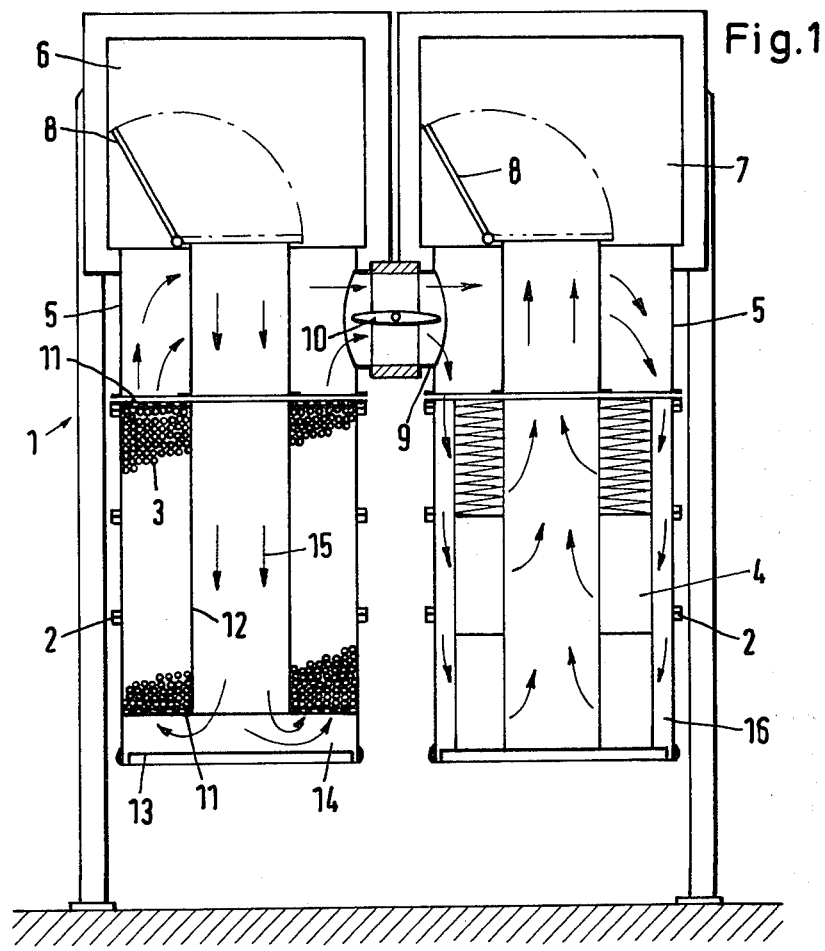
FIG. 1 shows a complete two-stage combination filtration plant with a sand filter and a suspended material filter in section with the waste tanks constructed as drum filters. The air supply and removal in the ducts above the covers can be sealed off by pivoted flaps, in the same way as the pipe connecting pieces between the drum filters. Air flows to the coarse filter layer centrally and from the bottom. The air flow in the following suspended material filter of the adjacent takes place from the outside to the inside through the filter cartridge.

FIG. 1 shows in cross-sectional form the complete filter principle of a cohesive two-stage drum filtration installation.

The standardized waste tanks 2, which can either be equipped with a granular layer 3 or with a suspended material filter insert 4, are initially connected by covers 5 to the supply air duct 6 and the spent air duct 7. Pivoted flaps 8 are positioned in ducts 6 and 7 and serve to seal off the supply and spent air flow to waste tanks 2 when replacing the tanks 2 after dust saturation.

Covers 5 fixed to ducts 6 and 7 are interconnected by a pipe connecting piece 9 provided with a pivoted flap 10. In this case the indicated loose material filter serves as a coarse filter layer 3 and is in particular suitable inter alia for the prior separation of smoke constituents, such as high-grade steel and iron melting smoke, aluminum oxide and smoke mixed with dust from molten concrete which, at elevated temperatures and charged with smouldering residues enters the sand bed of the coarse filter.

To this end the angular or round 200 or 400 liter waste tank 2 has at the top and bottom an angular or circular porous perforated plate covering 11 and is equipped internally with a central pipe 12 carrying supply air. The lower perforated plate 11 forms a cavity 14 towards the waste tank bottom 13.

The sand material 3, e.g. classified quartz, basalt or lava sand or protective area sand with a large surface area, introduced between the perforated plate members 11 is traversed by the air 15 laden with harmful substances and which flows in through central pipe 12 from bottom to top through the complete tank or loose material level 3 in order to finally flow from the outside to the inside via cover 5 and the pipe connecting piece 9 into the adjacent cover 5 with the suspended material filter insert 4. The cavities of insert 4 in tank 2 carrying the supply and spent air can, if necessary, be filled with concrete. The sand filter bed 3 of the waste tank or coarse filter tank 2 can be filled in concrete-like manner from above with cement grout.

Figure 2:
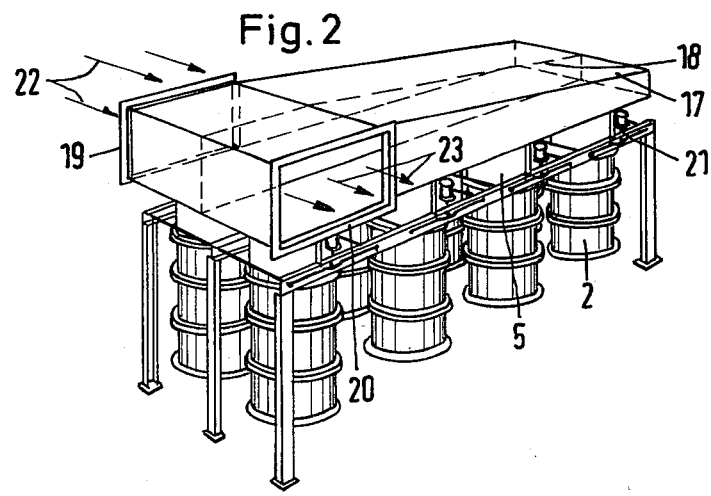
FIG. 2 is a perspective view illustrating the principle of a complete two-stage filtration plant with inclined supply and spent air ducts, including the supply and spent air flanged connections or a total of eight filter vessels or tanks.

FIG. 2 is a perspective view of a two-stage filtration installation 1 with eight drum filters. In each case two waste tanks are juxtaposed and/or interconnected, one tank 2 receiving the coarse filter and the other tank 2 the fine filter. By means of the pressing clamping devices 21 that are arranged together with the covers 5 on an inclined air duct 17, subdivided by a central partition 18 into a supply and spent air area with flanged connections 19 and 20, the supply air 22 flows in laterally and the spent air 23, after cleaning, can flow out again laterally.

Figure 3:
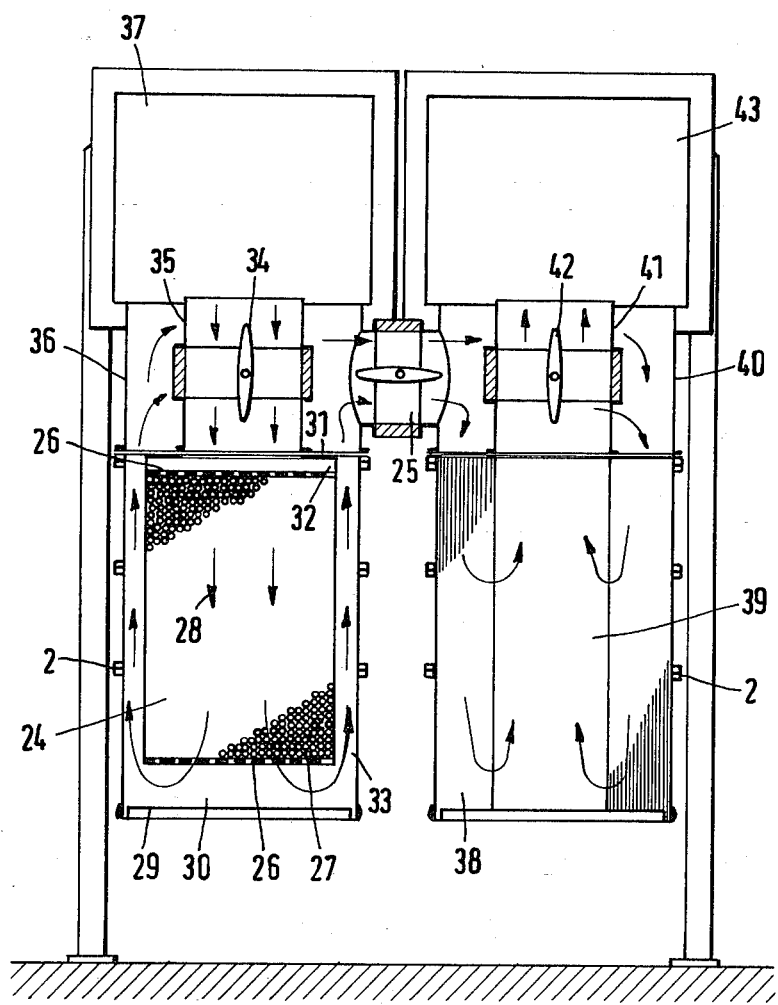
FIG. 3 shows a two-stage drum filtration plant in which the coarse filter comprises a waste tank with an incorporated intermediate container having perforated plates at the top and bottom so that the air passes vertically through the granular layer, so as to be able to flow out again laterally past the intermediate container. The following drum filter is provided with a suspended material filter insert. All the pipe connections for blocking off the air flow are pivoted flaps with a central axis.

FIG. 3 shows a two-stage drum filtration installation in which the waste tank 2 is filled with a loose material 27, being equipped with an intermediate container having an unperforated outer wall 24 and an upper and lower perforated plate covering 26.

The intermediate space 24 formed by the perforated plate coverings is filled e.g. with a fine-grained material 27, which as a filter layer is exposed to the action of supply air 28 from top to bottom. A cavity 30 is formed between perforated plate covering 26 and waste tank bottom 29. There is also a cavity 32 between the upper perforated plate covering 26 and the centrally perforated intermediate container cover 31. The annular cavity 33 between the waste tank inner wall 2 and the outer wall of intermediate container 24 is used for the return flow of the cleaned air 28 which flows into the coarse filter with the granular material 27 from the upper supply duct 37 through the guide of central pipe 35 equipped with pivoted flap 34 in cover 36. After leaving the coarse filter the air flows through the sealable pipe connecting piece 25 into the following star-shaped suspended material filter 38 of tank 2 from above. It leaves tank 2 through the central pipe section 39 via the upper central pipe 41 with pivoted flap 42 and cover 40 in order to flow in cleaned form out of the spent air duct 43.

Here again considering the possibility of insulating all the coarse filter cavities 30, 32 and 33 and the cavities in the following star-shaped suspended material filters 38 of folded filter paper in the case of serious contamination, the two waste tanks 2 are optionally filled with concrete or other liquid, self-hardening insulating material.

FIG. 4 shows a two-stage drum filtration plate with a loose material coarse filter in waste tank 2, comprising two concentrically telescoped, on edge perforated plate cylinders 44 and 45, whose gap therebetween is filled with loose material 27. The supply air 28 flows from supply air duct 37 via central pipe 35 in cover 36 from top to bottom horizontally through the filter layer 27 and after adequate contact leaves the latter through cavity 33. By means of cover 36 and the sealable pipe connecting piece 25 the air flows into the end of filter 46 constructed as a supended material filter of the following waste tank 2. The cleaned air then leaves filter 46 via central pipe 41 and cover 40 and then flows out again through the spent air duct 43. Cylinder 44, 45 has a perforated cover 31 and is somewhat covered on the upper porous side 47 to prevent the passage of infiltration air through sagging contact agents.

FIG. 5 shows a coarse drum filter with a two-layer filling of different grain size 49, 50 filled into two cylindrical cavities of waste tank 2 and subdivided by three disk-shaped perforated plate coverings 48. A cavity 30 is formed between tank bottom 13 and the lowermost perforated plate covering 48. The supply air 28 from duct 52 flows through cover 40 from the top into filter layer 49, 50. After contact with the coarse loose material 50 and finer loose material 49 the cleaned air leaves the filter layers 49, 50 via the lower cavity 30 and from there flows through the central pipe 51 into the uppermost spent air duct 53. The central pipe 54 of cover 40 seals with sloping edges 55 on the sealing edge of central pipe 51 of the drum filter in tank 2.

FIG. 6 shows a two-stage drum filter within the waste tank 2. A cavity 56 towards the tank inner wall 2 is formed between the intermediate container outer wall 57.

The intermediate container wall 57 is subdivided into two cylindrical chambers by three circular perforated plate coverings 48 and the chambers are filled with a granular material of different particle sizes 49, 50. The supply air 28 from the upper duct 53 initially flows into the filter via a central pipe 54, which seals with the bevels 55 on the intermediate container cover 58. A cavity 59, through which the entering air 28 is distributed, is located between the cover 58 and the uppermost perforated plate covering 48. The air then flows through the coarse layer 50 and the fine layer 49 into the lowermost cavity 30 and from there via cavity 56 between the wall of waste tank wall 2 and the outer wall of intermediate container wall 57 to cover 40 and spent air duct 52.

FIG. 7 shows a two-stage drum filter with two juxtaposed filter layers 49, 50, separated by a vertical partition 61 in the centre of waste tank 2. Cavity-forming, inclined perforated plate covers 62 are located at the top and bottom in tank 2. The supply air 28 forming the left-hand supply air duct 37 initially flows through the sealable pipe 60 and the underlying coarse filter layer 50 and from there via the lower cavity 63 into the finer filter layer 49. The cleaned air then flows from the sealable pipe 64 back into the spent air duct 43.

FIG. 8 shows another version of a two-stage drum filter. In this case the waste tank 2 is subdivided into two filter chambers by three cylindrical, on edge, concentrically nested perforated plate covers 65, 66, 67. These chambers are filled with the coarse filter material 50 and the finer filter material 49. The tubular, innermost member 67 forms the supply air intake for the air 28 from the uppermost supply air duct 53. After horizontally traversing the coarse filter layer 50 and then the fine filter layer 49, the cleaned air 28 leaves tank 2 via cavity 68 between tank wall 2 and perforated cover 65 in order to finally be carried away by the spent air duct 52 via cover 40.

Figure 9:
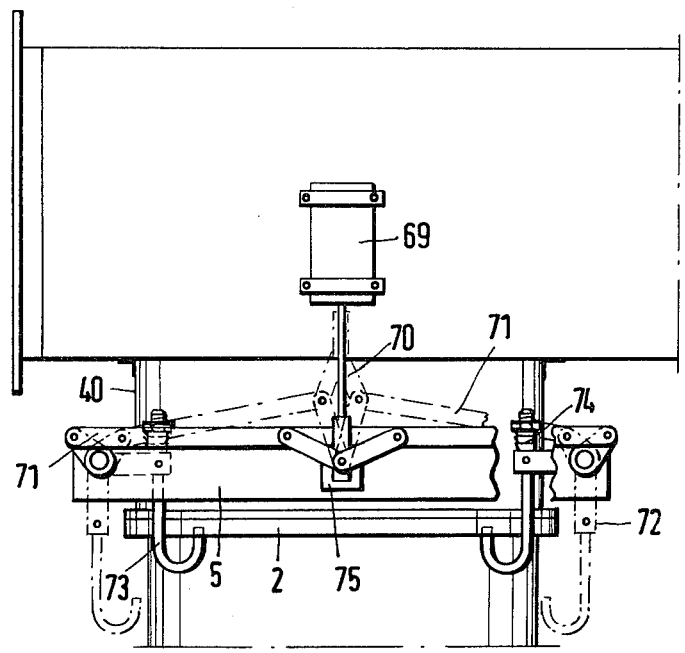
FIG. 9 is a lever-transmitted clamping device for drum filters to illustrate how the drum filter or waste tank is fixed to the cover with the duct secured thereto. The power cylinder opens up shears fixed at the bottom and moves the tie rods with the levers articulated thereto outwards until the resilient clamp dogs, pressure or tensioning hooks secure the tank to the cover and the complete process is blocked by a dead-centre or over centre position.

FIG. 9 shows a clamping device for the drum filter with waste tank 2, which can be pneumatically or oil-hydraulically operated e.g. by a power cylinder 69. Lever shears 70 are pressed downwards via fixed point 75 so that right and left-hand tie rods 71 move outwards. As a result, right and left-hand, knee-like toggle levers 72 with the resilient pressure or tensioning hooks 73, articulated in rotary manner by means of cup springs 74, are tightened. During this movement waste tank 2 is raised on cover 40 and secured. At this point, the tie rods 71 and the two upper shear levers 70 are positioned horizontally and consequently block any further movement through their dead-centre position. As a result pressure relief takes place for a long period on power cylinder 69.

Figure 10:
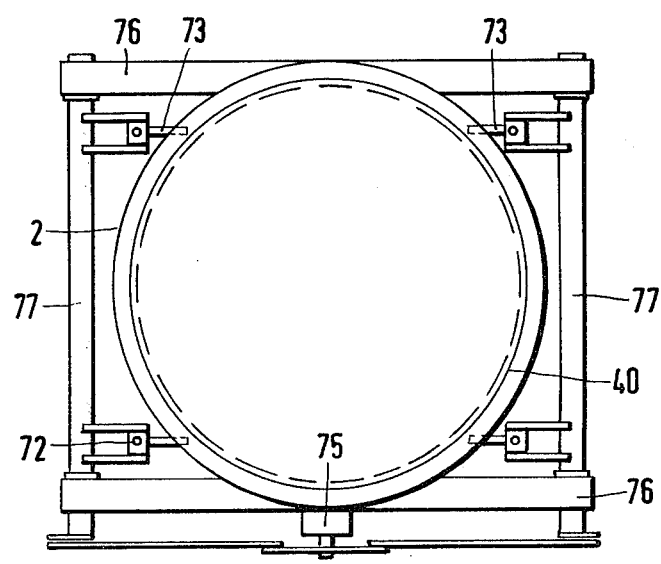
FIG. 10 is a plan view of FIG. 9 and shows the sectional steel support on the covers with the two rotating and operating shafts and the power cylinder attachment for the clamping device which acts on four sides.

FIG. 10 is a plan view of the drum filter of FIG. 9 and illustrates the fact that the rotary movement of the front two toggle levers 72 is synchronously transmitted by means of two pivoted shafts 77 to the two rear toggle levers 72 with the resilient pressure or tensioning hooks 73. The bearing support of shaft 77 takes place on U-beams 76, fixed to cover 40 of the filtration plant. Power cylinder 75 is also arranged on the cover 40.

Figure 11:
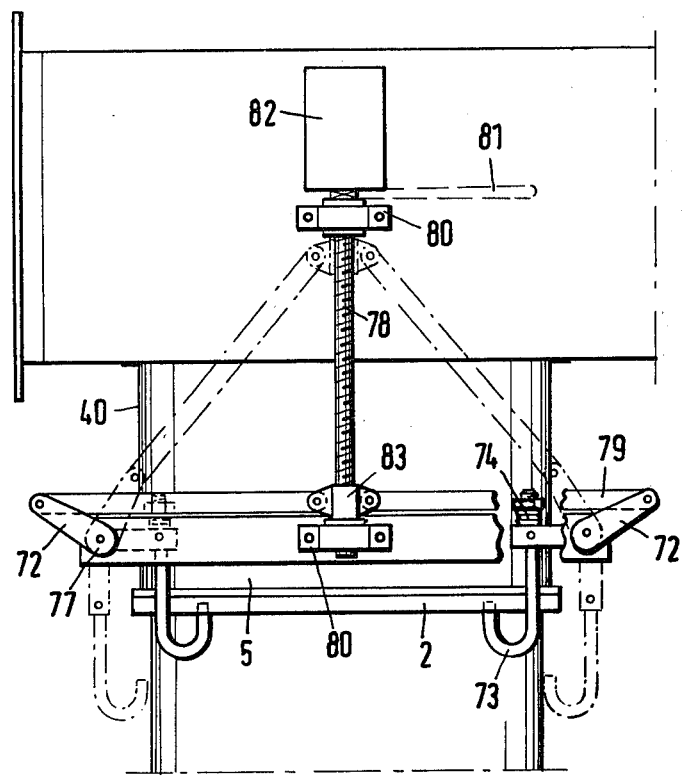
FIG. 11 is another clamping device for drum filters, working with a vertical threaded spindle mounted in rotary manner and a threaded bushing running thereon. The two tie rods for the shafts and the lateral toggle joints are rotatably arranged on the threaded bush. As desired, this operation can be carried out by means of gear motors and eccentric disks or power cylinders and/or by means of a reversible ratchet member.

FIG. 11 shows a clamping device for drum filters in waste tank 2 in which the releasing power transmission component from a vertical threaded spindle 78, pivoted in two bearings 80, reciprocates a threaded bushing 83 by rotation via a ratchet 81 or a gear motor 82 with eccentric disk and lever. As a result, rotatably articulated tie rods 79 with the knee-like toggle levers 72 are brought into a self-locking clamping position on the threaded bushing 83, so that the tank 2 is sealingly pressed on to cover 40 via the four clamping points of the resilient pressure or tensioning hooks 73. The dead-centre position of lever 79 leads to a pressure relief on the drive. Adequate tension is supplied by the resilient means 74.

Figure 12:
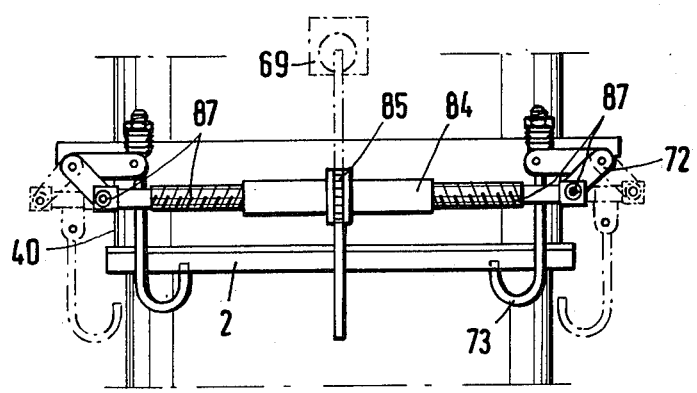
FIG. 12 shows a clamping device for drum filters comprising an adjusting nut member provided with a ratchet and functioning as a lifting jack. A right and left-hand threaded spindle operates the toggle joints and resilient tensioning hooks in a self-locking manner.

FIG. 12 illustrates a clamping device which, by means of a so-called self-locking lifting jack 84 or a tensioning jack with right and left-hand thread 84, actuates two threaded spindles 87 with right and left-hand thread and end shackles on both sides by means of a ratchet 85. The knee-like toggle levers 72 are forced outwards, so that the resilient tensioning hooks press the tank 2 onto cover 40. Ratchet 85 can be replaced by power cylinders 69, which perform pulsed ratchet movements.

FIG. 13 is based on the fact that in waste tank 2 the drum filter is subject to the action of a stationary anchored 92 worktable or lifting table 88 positioned under tank 2 and operated by a threaded spindle 89 with a ratchet 90 and can be raised or lowered into a random position by articulation 91 and can be pressed on to the covers 40 of filtration plant 1. In the same way the worktable 92 anchored in the base of a transportable device 95 provided with rollers 93 can be simultaneously used as a tank transporting means and as a tensioning means for the waste tank 2. To this end e.g. four semicircular, recessed fixing points 94 are provided in the floor beneath the waste tank 2 for mounting and precisely positioning the movable table 95. For the tensioning lifting tables 88 and 95 a reversible ratchet lever 90 is preferably used, in addition to a random drive.

FIG. 14 shows a portable, two-stage filtration plant with fan 96 and suction nozzle 97, which comprises two waste tanks 2 with a coarse filter and a ultra-fine filter, respectively. The coarse filter, which comprises any of filters 3, 27, 49 and 50, can be filled e.g. with coarse crushed sand, fine basalt or lava sand in a two-stage arrangement, but also with contact agents. The following suspended material filter can be any of filters 4, 38 and 46 comprising filter paper folded in disk, cartridge, star or pack form.

The filtration plants proposed in the present invention have important safety advantages obtained with limited apparatus expenditure.

The possibility of transferring harmful constituents from the air, without intermediate stations by the shortest route to the final point where they are to be packed and made radiation-free has not hitherto been realized in this form by any prior art filter construction.

These internationally standard waste tanks, which can be converted into drum filters without any external modifications, also fulfill the necessary requirements for use in toxic or nuclear installations.

An optimum action is obtained because an 800 to 1000 mm filling with granular or amorphous loose material is possible in the case of the 200 and 400 liter tanks. Due to the large volume of the waste tanks it is also possible to incorporate large-area paper filters, directly connected in series with the coarse filters and which, together with the air ducts, form a complete filtration plant.

Through the use of naturally fine sands or porous crushed sands as the loose material layer in the form of fine lava or basalt particle fractions, whose surface areas can additionally be charged with active substances, the use of such drum filters is of particular interest when hot, radioactive melting smoke with high smouldering residues have to be removed by suction directly at the source.

The sand bed arrangement in the waste tank can easily be attained in one or two-stage form through the use of different particle sizes with incorporated final mixing obstacles. In the same way it is possible to fill the waste tank with activated carbon or other contact agents.

Due to the fact that each cover connects a waste tank, including the incorporated filter, to an air duct and also, as also each cover have a pipe connection to the adjacent tank with filter and its own air duct, every multistage filter combination described above is possible.

Various pressing means equipped with various lever settings for the dead-centre position and which serve to link the covers with the drum filters and press them against one another for sealing against air leaks, can be used just as well manually, as for the different power cylinder proposed releasable by remote control. These units are particularly suitable as transportable filtration plants with drum filters, fans and suction connection.

The problem of higher pressure differences between two interconnected filter drums with respect to the higher energy expenditure does not occur with the present system. Plants of this type are used temporarily and not continuously in the indicated fields. Therefore, greater importance is attached to the safety and reliability of the filters then to the higher energy needs of the filtration plants, which are only operated on a temporary basis.

Having thus described my invention, what I claim is:

1. Filter elements with changing devices and contamination protection, installed in waste tanks and serving to separate substances which are prejudicial to the health from the breathing or process air of ventilation systems used in nuclear installations, wherein a filtration plant comprises two series-arranged waste tanks within each series a coarse material filter and a fine material filter interconnected by a detachable cover constructed for air guidance purposes by means of a lockable, air-carrying pipe connecting piece and whose projecting central pipes closable by means of flaps for carrying the supply and spent air respectively are in each series fixed in stationary manner to a superimposed, inclined, juxtaposed air duct partitioned for dustladen and clear air respectively with lateral connections.

2. A filter element according to claim 1, wherein the coarse filter comprises an air-permeated porous loose material, of homogeneously fractionated crushed sand which can be charged with harmful substances from bottom to top the coarse filter being fitted between an upper, perforated plate covering inserted horizontally over the entire tank cross-section and a lower, perforated plate which is spaced from the tank bottom and between in each series one central air supply pipe sealable by means of pivotable flaps and located in the tank centre, through which the dustladen air must pass before it comes into contact with the coarse filter layer and subsequently flows via the cover and the air supply pipe, connecting pieces lockable by the pivoted flaps into the waste tank with the fitted suspended material filter, against which air flows from the outside to the inside and is removed again at the top through the cover central pipe via the air duct.

3. A filter element according to claims 1 or 2, wherein the covered coarse filter waste tank is sealable by a pivoted flap in the central pipe, provided with a cover and a sealable pipe connecting piece having an intermediate container filled with grandular loose material, is centrally arranged and is traversed from top to bottom by air laden with harmful substances, and towards the inner wall of the waste tank said intermediate container forms an outer annular cavity for the outflow of the clean air and having at the top and bottom over the entire intermediate container cross-section in each case one horizontally inserted disk-shaped perforated plate covering leaving open air-carrying cavities both at the top towards the centrally perforated intermediate container cover and at the bottom towards the waste tank bottom, and wherein said outer annular cavity between the waste tank and intermediate container wall is fillable from the top with a liquid, self-hardening, radiation protection medium.

4. A filter element according to claim 1, wherein the coarse filter waste tank is provided with two concentrically telescoped, on edge, top-covered perforated plate jacket rings, sealed by a cover and whose space therebetween is filled with loose material, said rings forming internally a porous central pipe and externally an annular cavity towards the inner wall of the waste tank so that the pre-cleaned air which has previously traversed the loose material layer in both the thickness direction and the length direction from the supply air duct from top to bottom through the porous central pipe can flow upwards again to the cover and from there via the sealable pipe connecting pieces and the cover to the series-connected waste tank with the incorporated suspended material filter for final cleaning purposes and then passes from the outside to the inside via a sealable central pipe to the spent air duct for air carrying purposes.

5. A filter element according to claim 1, wherein the coarse filter waste tank filled with granular loose material has in the inner area a central pipe and three circular perforated plate coverings filling the entire tank cross-section which subdivide the tank space into two cylindrical halves, whose inner areas are filled with classified sand of different particle sizes and which are successively traversed from top to bottom by the air laden with harmful substances from the supply air duct via the cover until after passing through the cavity between the lowest perforated sheet covering and the tank bottom the pre-cleaned air leaves the waste tank again via a central pipe and the spent air duct positioned above the supply air duct.

6. A filter element according to claim 1, wherein the coarse filter waste tank is provided with an intermediate container through which the air laden with harmful substances flows from top to bottom and towards the inner wall of the waste tank leaving open an annular cavity and whose inner space is covered by three disk-shaped perforated plates such that two hollow cylinder halves are formed, the cylinder halves being filled in the air flow direction with sand particle fractions which become increasingly fine and in which the lowermost perforated plate covering towards the tank bottom and the uppermost perforated plate covering towards the perforated intermediate container cover form cavities, the supply air flowing in from an upper supply air duct via a central pipe with a sloping gasket until, after vertically passing through the graded filter layers, the spent air can flow out via the outer cavity between the waste tank and intermediate container and via the cover inner space to the clean air duct.

7. A filter element according to claim 1, wherein the waste tank filled with loose material comprising or an activated contact agent has a precisely centrally located, vertically installed partition which divides off a coarse layer from a finer granular layer and through inclined, roof-shaped upper and lower perforated plate coverings forming the cavity the air laden with harmful substances firstly traverses the coarse granular layer from top to bottom and then the fine granular layer from bottom to top and for which purpose there are provided in the detachable cover fixed to the waste tank separate and sealable supply and spent air connections, which in turn issue in each case into a air duct partitioned for supply air and spent air, respectively.

8. A filter element according to claim 1, wherein the coarse filter waste tank is subdivided by at least three concentrically telescoped perforated cylinders, which are sealed somewhat at the top, so that two annular cavities successively arranged in the air flow direction are formed, the cavities being filled with loose material having different particle sizes and whereby the air laden with harmful substances flows, via a central pipe from the upper supply air duct through the cover into the waste tank until, after horizontal contact with the step filter layers, said air leaves the waste tank again via the outer cavity between the perforated cover and the inner wall of the tank and through the cover to the superimposed spent air duct.

9. A filter element according to claim 1, wherein to bring about the necessary sealing between the cover flange and the coarse filter waste tank flange a lever-transmitted clamping device engages by means of tensioning or pressing hooks resiliently supported by cup spring plates, said hooks being individually formed by two fixed shafts located in two transverse members on the cover and about whose fulcrums on the shafts are arranged in each case one knee-like articulated lever carrying the rotatable resilient pressure hooks, said levers being connected on the operating side with on each side a left-hand and right-hand power transmission rod held in the centre of an unequal-sided shears with four lever members on which acts a fluid power cylinder producing a self-locking dead-centre position of the levers in order to bring about a permanent cylinder pressure release during filter operation.

10. A filter element according to claim 1, wherein a lever-transmitted, resilient clamping device acts between the cover and the waste tank filter by means of a linkage operated by a threaded spindle arranged vertically and rotatably between two bearings by means of a motor gear in order to move a threaded bushing upwards or downwards, whereby tie rods articulated in a rotary manner thereto can be carried along by said bushing and are in turn coupled to toggle levers and resilient pressure or tensioning hooks, the threaded spindle being brought into a self-locking dead-centre position by the horizontal tension position of the tie rods in order to permanently relieve the motor gear.

11. A filter element according to claim 1, wherein by means of a lifting or tensioning jack with a right or left-hand thread and a centrally positioned ratchet by means of a lever or by means of a pulsed power cylinder a right and left-hand threaded shaft with end shackles is moved in the direction of the rotary, knee-like lever linkage, so that the self-locking, resilient pressure or tensioning hooks are either fixed to the waste tank flange or detached therefrom.

12. A filter element according to claim 1, wherein the complete waste tank is raised and pressed by a worktable moved in shear-like manner which is fixed to the bottom or is movable on rollers, said worktable being operated by a known, centrally arranged threaded spindle and by nuts located thereon with articulated levers either by means of a ratchet member or by means of automatically operable power transmission elements, the movable worktable version being adjustable by fixed bottom depression via the rollers.

* * * * *